United States Patent
Ho

(10) Patent No.: US 9,869,402 B2
(45) Date of Patent: Jan. 16, 2018

(54) CHECK VALVE

(71) Applicant: Chin-Hua Ho, Changhua (TW)

(72) Inventor: Chin-Hua Ho, Changhua (TW)

(73) Assignee: Chyi Liou Enterprise Co., Ltd., Changhua (TW)

( * ) Notice: Subject to any disclaimer, the term of this patent is extended or adjusted under 35 U.S.C. 154(b) by 220 days.

(21) Appl. No.: 15/049,163

(22) Filed: Feb. 22, 2016

(65) Prior Publication Data
US 2016/0169397 A1  Jun. 16, 2016

(51) Int. Cl.
*F16K 15/02* (2006.01)
*F16K 15/06* (2006.01)
*E03C 1/04* (2006.01)

(52) U.S. Cl.
CPC .......... *F16K 15/063* (2013.01); *E03C 1/0408* (2013.01); *F16K 15/026* (2013.01)

(58) Field of Classification Search
CPC ....... F16K 15/026; F16K 15/06; F16K 15/063
See application file for complete search history.

(56) References Cited

U.S. PATENT DOCUMENTS

| | | | | |
|---|---|---|---|---|
| 4,862,913 A * | 9/1989 | Wildfang | ............... | F16K 15/063 137/516.29 |
| 5,494,069 A * | 2/1996 | Bergmann | ............ | F16K 15/063 137/493.2 |
| 8,707,981 B2 * | 4/2014 | Edgeworth | ........... | F16K 15/063 137/270 |
| 2004/0045607 A1 * | 3/2004 | Lammers | ............... | F16K 15/063 137/543 |
| 2004/0079418 A1 * | 4/2004 | Weis | ..................... | F16K 15/063 137/542 |
| 2006/0011238 A1 * | 1/2006 | Fangmeier | ............ | F16K 15/063 137/513.3 |

\* cited by examiner

*Primary Examiner* — Ryan A Reis

(57) ABSTRACT

A check valve includes a hollow cylindrical valve body including an inclined rim at a first end, an annular section on an inner surface and tapered to a second end, and an annular groove on an outer surface; a hollow cylindrical outlet member including an axial channel, openings around an end surface, an internal annular trough, an annular flange extending outward from the trough of the outlet member, and an annular groove on an outer surface; a moveable member including an annular groove on an outer surface, a stem distal the groove of the moveable member, and an annular trough on an inner surface; a ring including an axial channel and openings around the channel; and a biasing member having a first end anchored in the trough of the moveable member and a second end anchored in the trough of the outlet member.

1 Claim, 5 Drawing Sheets

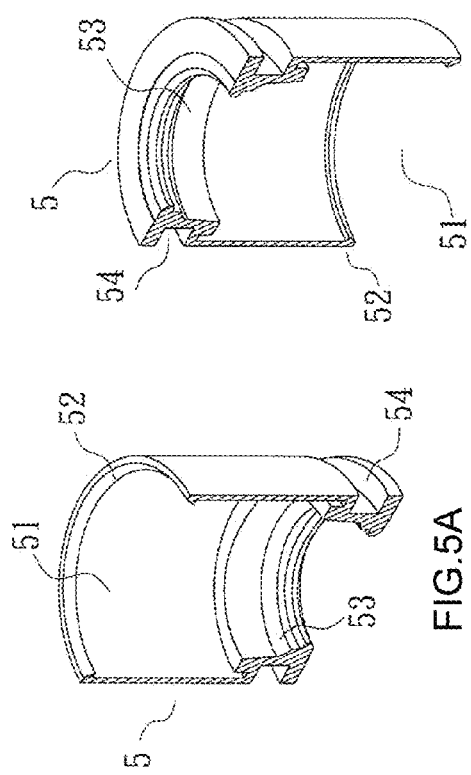
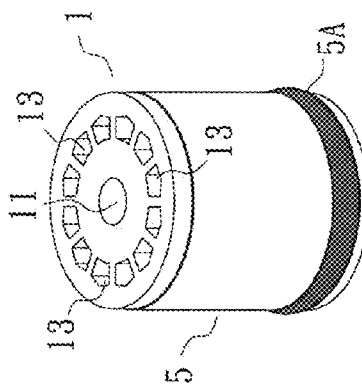
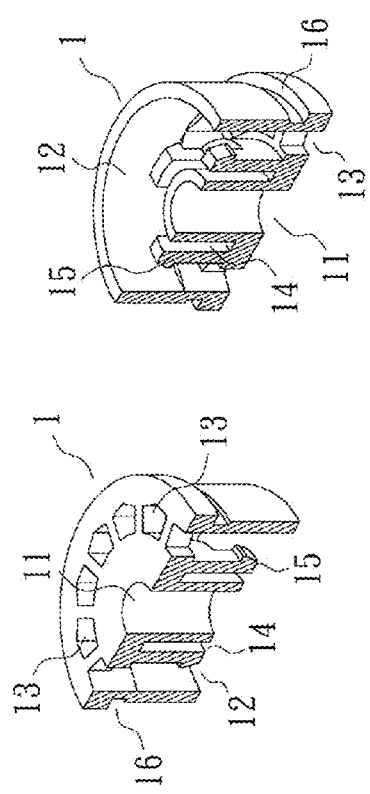
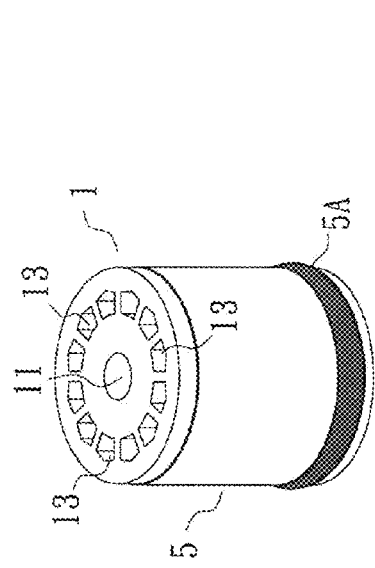
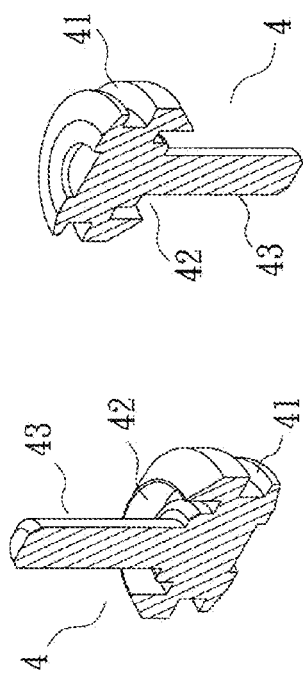

US 9,869,402 B2

CHECK VALVE

BACKGROUND OF THE INVENTION

1. Field of the Invention

The invention relates to check valve and more particularly to a check valve having improved characteristics.

2. Description of Related Art

A conventional check valve comprises a valve body; a nozzle coupled to inside of the valve body; an annular disc in the valve body and including a barrel, a disc portion disposed about the barrel, a central opening disposed between the barrel and the disc portion, and radial arms extending between the disc portion and the barrel; a first spacer having slots extending in the axial direction along an annular wall wherein each radial arm of the radial arms is disposed in one of the lots; and a first fluid passage in fluid communication with the annular disc. The annular disc is configured to move in an axial direction without rotation relative to the valve body to open and close the first fluid passage.

While the device enjoys its success in the market, continuing improvements in the exploitation of check valve of this type are constantly being sought.

SUMMARY OF THE INVENTION

It is therefore one object of the invention to provide a check valve comprising a hollow cylindrical valve body including an inclined rim at a first end, an annular section on an inner surface and tapered to a second end, and an annular groove on an outer surface and adjacent to the second end; a hollow cylindrical outlet member including an axial channel, a plurality of openings disposed around an end surface, an internal annular trough, an annular flange extending outward from the trough of the outlet member, and an annular groove on an outer surface and adjacent to the end surface;

a moveable member including an annular groove on an outer surface and adjacent to an end, a stem distal the groove of the moveable member, and an annular trough on an inner surface; a ring including an axial channel and a plurality of openings around the channel; and a biasing member having a first end anchored in the trough of the moveable member and a second end anchored in the trough of the outlet member; wherein the rim is disposed in the groove of the outlet member, the ring is disposed in the outlet member and partly seated on the flange, the openings of the ring are aligned with the openings of the outlet member, a first sealing ring is compressed by the ring and the outlet member, the stem is moveably disposed in the channel of the outlet member, the moveable member is disposed in the valve body, a second sealing ring is disposed in the groove of the moveable member and partly seated on the annular section, and a third sealing ring is disposed in the groove of the valve body.

The above and other objects, features and advantages of the invention will become apparent from the following detailed description taken with the accompanying drawings.

BRIEF DESCRIPTION OF THE DRAWINGS

FIG. 3A is a fragmentary longitudinal section of the outlet member;

FIG. 3B is another fragmentary longitudinal section of the outlet member;

FIG. 4A is a fragmentary longitudinal section of the moveable member

FIG. 4B is another fragmentary longitudinal section of the moveable member;

FIG. 5A is a fragmentary longitudinal section of the valve body;

FIG. 5B is another fragmentary longitudinal section of the valve body;

FIG. 6 is a perspective view of the valve body and the outlet member shown in FIG. 1;

DETAILED DESCRIPTION OF THE INVENTION

Figures 1, 2:
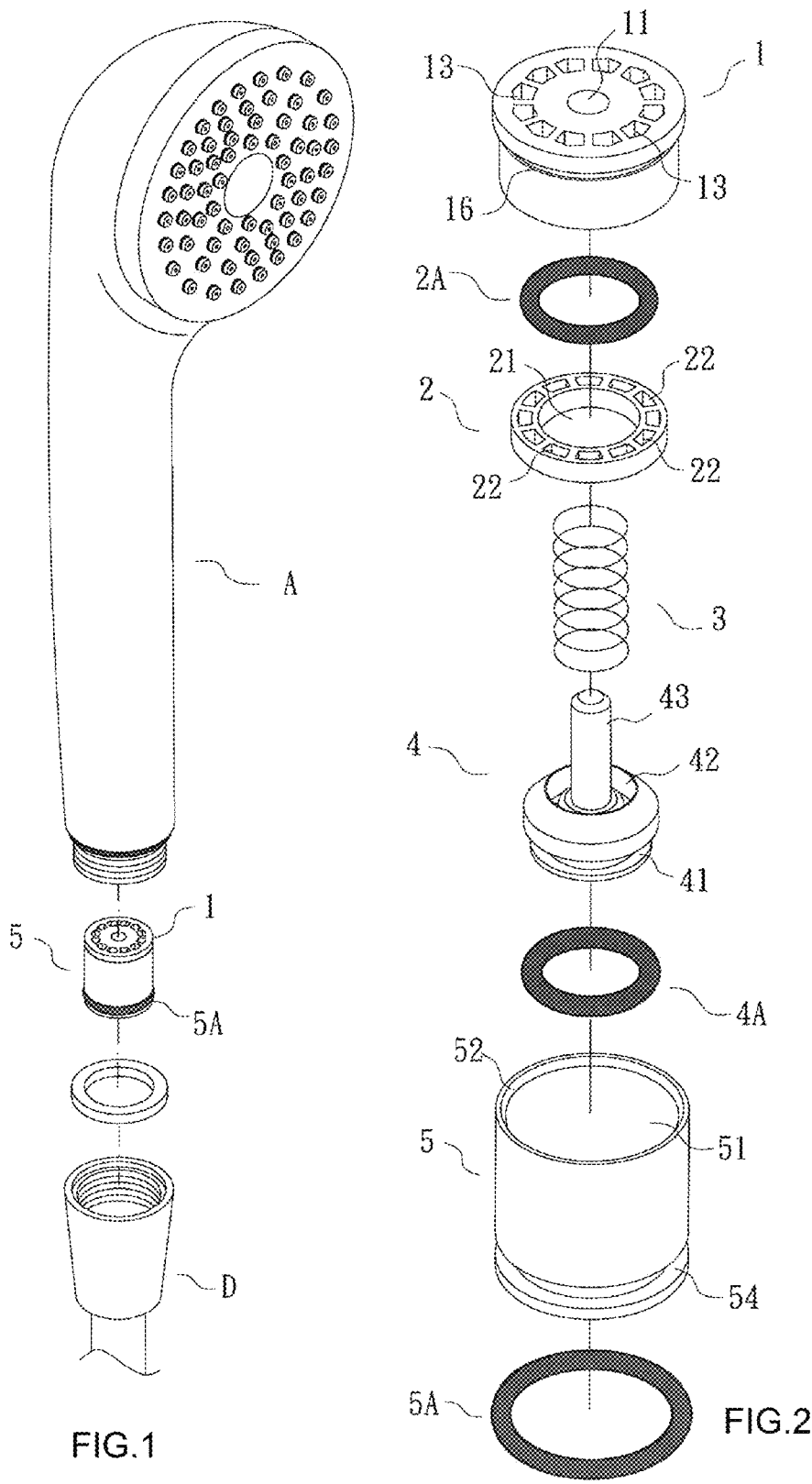
FIG. 1 is an exploded perspective view of a check valve mounted in a moveable shower head according to a first preferred embodiment of the invention.
FIG. 2 is an exploded view of the outlet member, the valve body and components in the outlet member.
Figure 8:
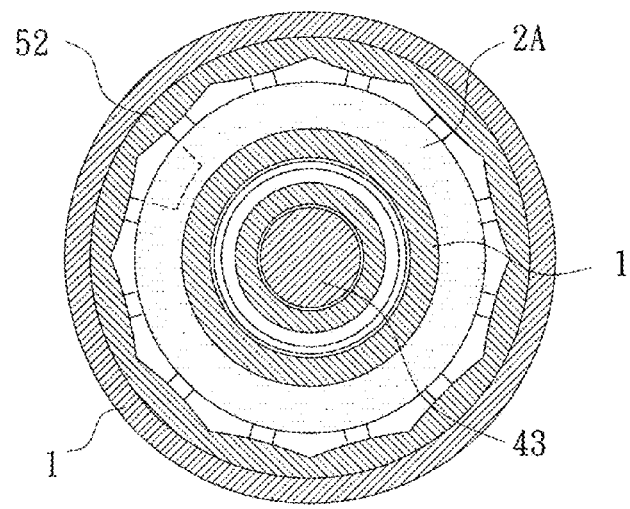
FIG. 8 is a cross-section of FIG. 7.
Figure 7:
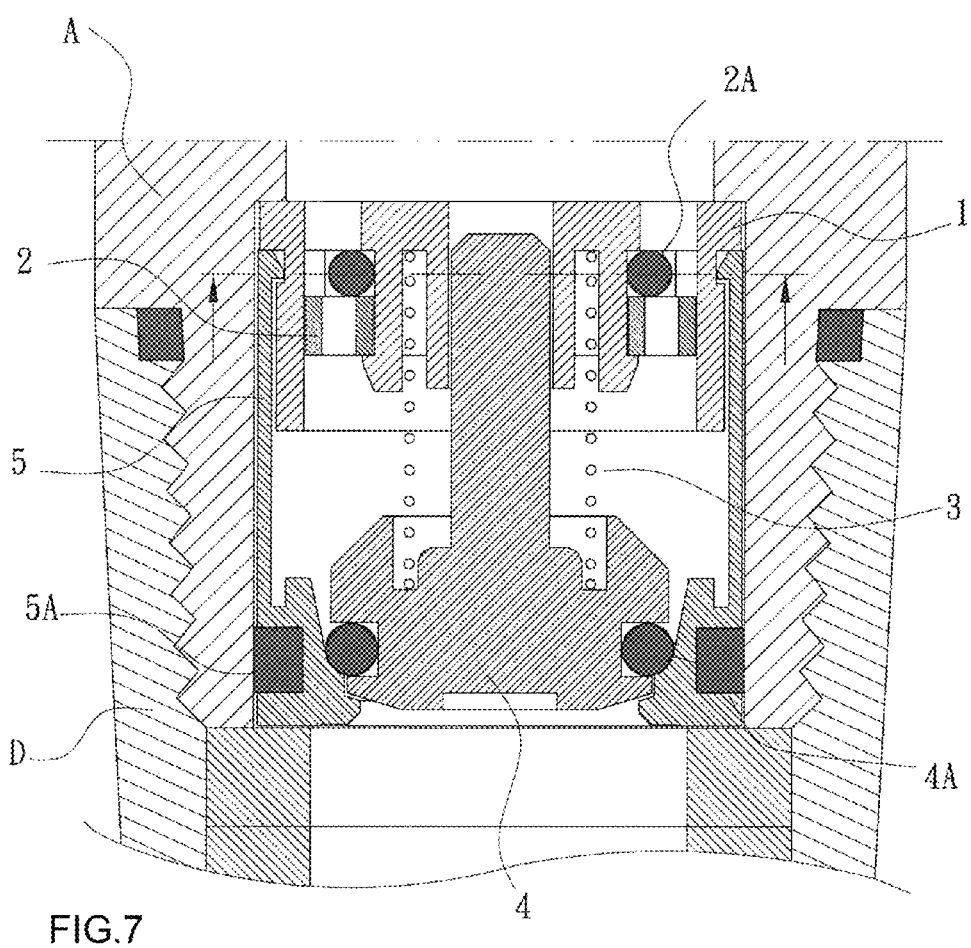
FIG. 7 is a longitudinal section of the check valve mounted in the shower head.
Figure 9:
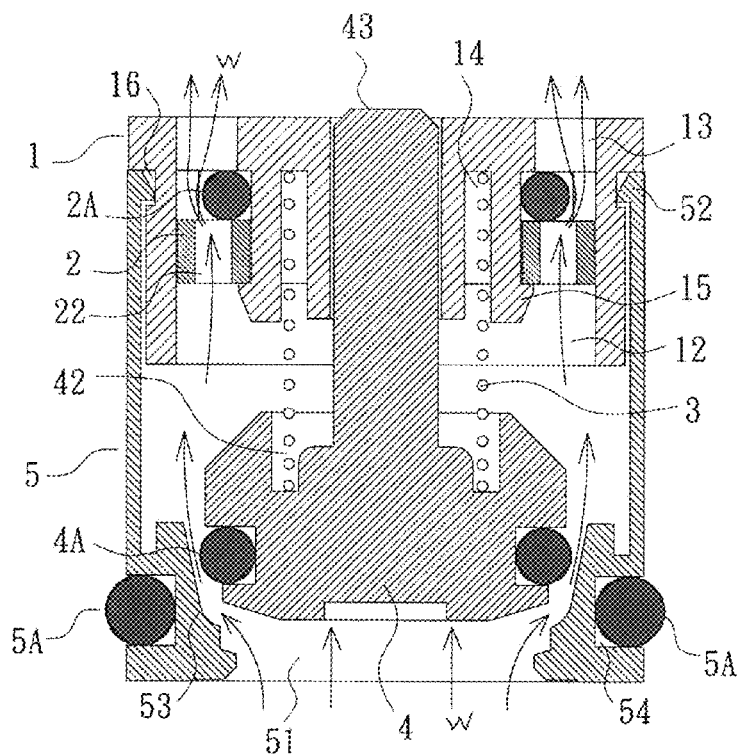
FIG. 9 depicts the check valve of FIG. 7 where the check valve is open when pressure from flowing fluid overcomes the elastic resistance of the torsion spring.
Figure 10:
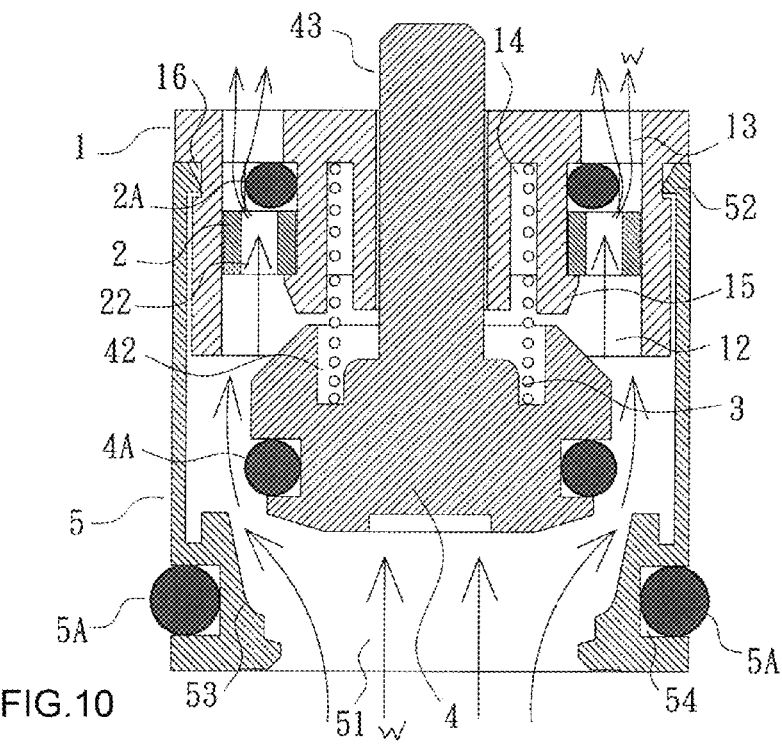
FIG. 10 is a view similar to FIG. 9 showing the flow further increased.

Referring to FIGS. 1 to 10, a check valve mounted in a moveable shower head A in accordance with a first preferred embodiment of the invention comprises the following components as discussed in detail below.

A cylindrical valve body 5 includes a through space 51, an inclined rim 52 at one end, an annular section 53 disposed in the space 51 and tapered to the other end, and an annular groove 54 on an outer surface and adjacent to the other end. A cylindrical outlet member 1 includes an axial channel 11, an internal space 12, a plurality of openings 13 disposed around one end surface and communicating with the space 12, an annular trough 14 disposed in the space 12, an annular flange 15 extending outward from the opening of the trough 14, and an annular groove 16 on an outer surface and adjacent to one end surface. A moveable member 4 includes an annular groove 41 on an outer surface and adjacent to one end, a stem 43 distal the groove 41, and an annular trough 42 on an inner surface and disposed between the groove 41 and the stem 43. A ring 2 includes an axial channel 21 and a plurality of openings 22 around the channel 21 and open to both end surfaces.

The valve body 5 is fastened in the shower head A. The rim 52 is disposed in the groove 16. The ring 2 is disposed in the outlet member 1 and partly seated on the flange 15. The openings 22 are aligned with the openings 13. A first sealing ring 2A is compressed by the ring 2 and an inner surface of the outlet member 1. A portion of the stem 43 is moveably inserted into the channel 11. A torsion spring 3 has one end anchored in the trough 42 and the other end anchored in the trough 14. One end of the moveable member 4 is seated on the inner surface of the valve body 5 and adjacent to the other end of the valve body 5. A second sealing ring 4A is disposed in the groove 41 and partly seated on the annular section 53. A third sealing ring 5A is disposed in the groove 54 and urging against the inner surface of the shower head A. The shower head A has externally threaded one end secured to internal threads at one end of a tube D.

The valve is open when pressure of fluid w overcomes the elastic resistance of the spring 3 (i.e., the spring 3 being compressed by the moveable member 4). Also, the stem 43 extends out of the channel 11 and the moveable member 4 disengages from the valve body 5. As a result, a flow path from an annular gap between moveable member 4 and the annular section 53 to the openings 22 and 13 is formed to allow the fluid w to flow through the valve (as indicated by arrows in FIGS. 9 and 10). It is understood that the valve will be closed (i.e., the moveable member 4 engaging the annular section 53 again due to the expansion of the energized spring 3) when the fluid w stops flowing or the fluid w is not strong enough to overcome the elastic resistance of the spring 3.

Figure 11:
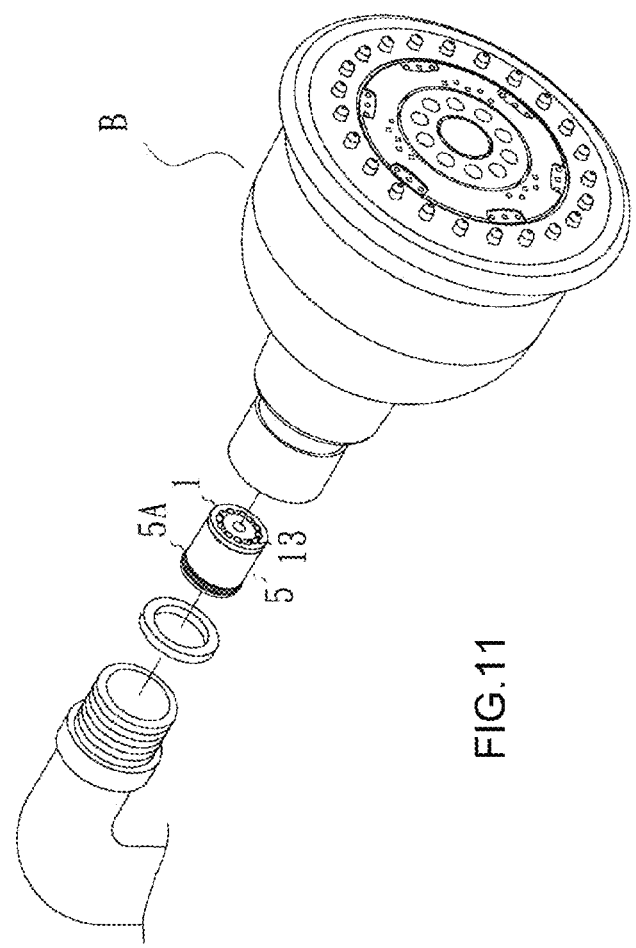
FIG. 11 is an exploded perspective view of a check valve mounted in a fixed shower head according to a second preferred embodiment of the invention.

Referring to FIG. 11, the check valve is mounted in a fixed shower head B in accordance with a second preferred embodiment of the invention.

Figure 12:
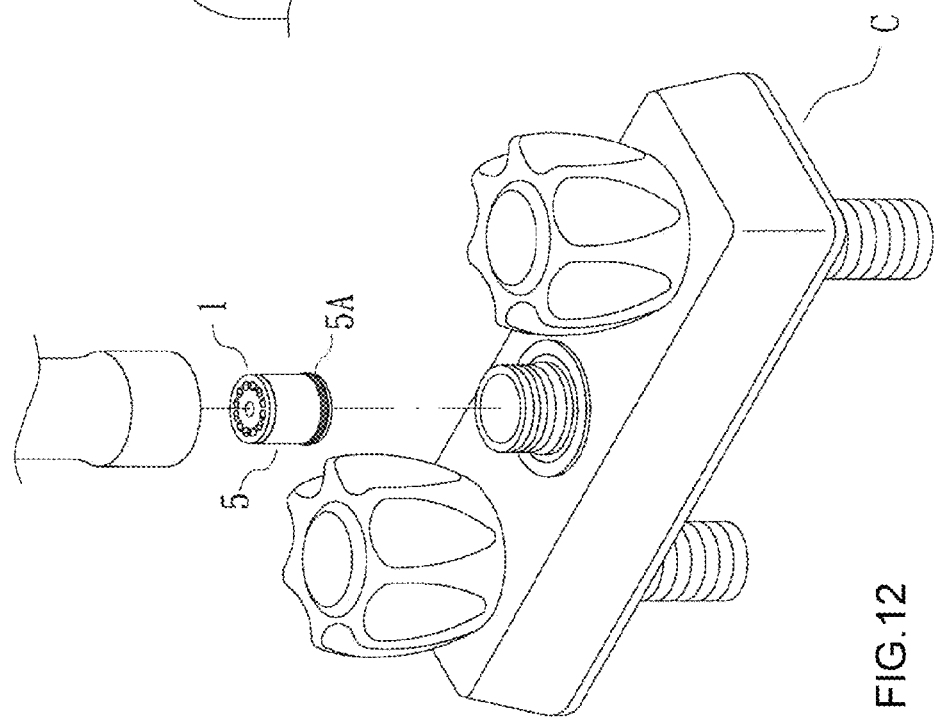
FIG. 12 is an exploded perspective view of a check valve mounted on a faucet assembly according to a third preferred embodiment of the invention.

Referring to FIG. 12, the check valve is mounted on a faucet assembly C in accordance with a third preferred embodiment of the invention.

While the invention has been described in terms of preferred embodiments, those skilled in the art will recognize that the invention can be practiced with modifications within the spirit and scope of the appended claims.

What is claimed is:

1. A check valve comprising:
   a hollow cylindrical valve body including an inclined rim at a first end, an annular section on an inner surface and tapered to a second end, and an annular groove on an outer surface and adjacent to the second end;
   a hollow cylindrical outlet member including an axial channel, a plurality of openings disposed around an end surface, an internal annular trough, an annular flange extending outward from the trough of the outlet member, and an annular groove on an outer surface and adjacent to the end surface;
   a moveable member including an annular groove on an outer surface and adjacent to an end, a stem distal the groove of the moveable member, and an annular trough on an inner surface;
   a ring including an axial tunnel and a plurality of openings around the tunnel; and
   a biasing member having a first end anchored in the trough of the moveable member and a second end anchored in the trough of the outlet member;
   wherein the rim is disposed in the groove of the outlet member, the ring is disposed in the outlet member and partly seated on the flange, the openings of the ring are aligned with the openings of the outlet member, a first sealing ring is compressed by the ring and the outlet member, the stem is moveably disposed in the channel of the outlet member, the moveable member is disposed in the valve body, a second sealing ring is disposed in the groove of the moveable member and partly seated on the annular section, and a third sealing ring is disposed in the groove of the valve body.

* * * * *